US012377507B2

(12) United States Patent
Bandoh et al.

(10) Patent No.: US 12,377,507 B2
(45) Date of Patent: Aug. 5, 2025

(54) CONTROL DEVICE, INDUSTRIAL MACHINE, AND CONTROL METHOD

(71) Applicant: KOMATSU LTD., Tokyo (JP)

(72) Inventors: Kenichi Bandoh, Tokyo (JP); Mohammad Munzir, Tokyo (JP)

(73) Assignee: KOMATSU LTD., Tokyo (JP)

( * ) Notice: Subject to any disclaimer, the term of this patent is extended or adjusted under 35 U.S.C. 154(b) by 376 days.

(21) Appl. No.: 18/042,418

(22) PCT Filed: Sep. 10, 2021

(86) PCT No.: PCT/JP2021/033327

§ 371 (c)(1), (2) Date: Feb. 21, 2023

(87) PCT Pub. No.: WO2022/059616

PCT Pub. Date: Mar. 24, 2022

(65) Prior Publication Data

US 2023/0347463 A1 Nov. 2, 2023

(30) Foreign Application Priority Data

Sep. 16, 2020 (JP) ................................ 2020-155792

(51) Int. Cl.

| | |
|---|---|
| ***B23Q 15/12*** | (2006.01) |
| ***B23Q 1/25*** | (2006.01) |
| ***G05B 19/402*** | (2006.01) |

(52) U.S. Cl.

CPC ............... *B23Q 15/12* (2013.01); *B23Q 1/25* (2013.01); *G05B 19/402* (2013.01); *G05B 2219/37383* (2013.01)

(58) Field of Classification Search

None

See application file for complete search history.

(56) References Cited

U.S. PATENT DOCUMENTS

| | | | |
|---|---|---|---|
| 6,400,998 B1 | 6/2002 | Yamazaki et al. |
| 2006/0251484 A1 | 11/2006 | Yoshida et al. |
| 2018/0029186 A1 | 2/2018 | Roders et al. |

FOREIGN PATENT DOCUMENTS

| | | |
|---|---|---|
| DE | 696 27 198 T2 | 2/2004 |
| JP | 60-175555 U | 11/1985 |
| JP | 63-108409 A | 5/1988 |

(Continued)

*Primary Examiner* — Ryan A Jarrett

(74) *Attorney, Agent, or Firm* — Global IP Counselors, LLP

(57) ABSTRACT

A relative displacement specification unit specifies a relative displacement between a jig and a tool. A position determination unit determines whether the jig and the tool are respectively positioned at a jig calibration point and a tool calibration point. A displacement correction unit corrects the measurement values of the displacements of the jig and the tool. A contact determination unit determines whether the tool has come into contact with a workpiece based on a measurement value related to a deflection of the tool. A tool length correction unit corrects tool length data based on the relative displacement when the tool is determined to have come into contact with the workpiece. A control unit generates a control command for controlling the jig or tool based on the relative displacement, a shape of the workpiece, and tool length data indicating a length of the tool.

13 Claims, 9 Drawing Sheets

(56) References Cited

FOREIGN PATENT DOCUMENTS

| | | | | |
|---|---|---|---|---|
| JP | 11-77491 | A | 3/1999 | |
| JP | 2001-105279 | A | 4/2001 | |
| JP | 2006-159299 | A | 6/2006 | |
| JP | 2018-508374 | A | 3/2018 | |
| JP | 2018-106604 | A | 7/2018 | |
| WO | 2006/016420 | A1 | 2/2006 | |
| WO | 2009/109064 | A1 | 9/2009 | |
| WO | WO-2017130412 | A1 * | 8/2017 | ............ B23Q 15/00 |

* cited by examiner

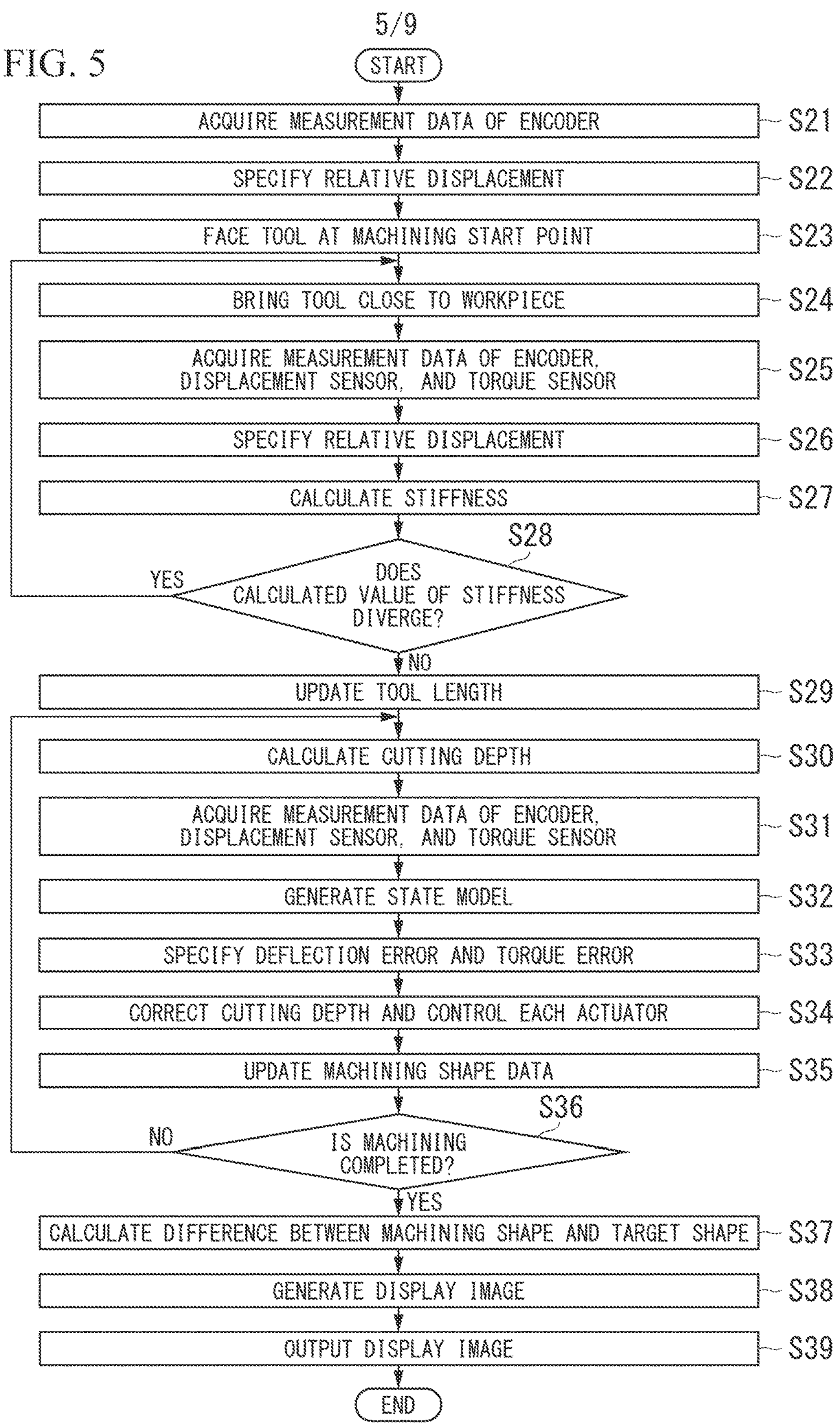
5/9
FIG. 5
START
ACQUIRE MEASUREMENT DATA OF ENCODER
S21
SPECIFY RELATIVE DISPLACEMENT
S22
FACE TOOL AT MACHINING START POINT
S23
BRING TOOL CLOSE TO WORKPIECE
S24
ACQUIRE MEASUREMENT DATA OF ENCODER, DISPLACEMENT SENSOR, AND TORQUE SENSOR
S25
SPECIFY RELATIVE DISPLACEMENT
S26
CALCULATE STIFFNESS
S27
S28
DOES CALCULATED VALUE OF STIFFNESS DIVERGE?
YES
NO
UPDATE TOOL LENGTH
S29
CALCULATE CUTTING DEPTH
S30
ACQUIRE MEASUREMENT DATA OF ENCODER, DISPLACEMENT SENSOR, AND TORQUE SENSOR
S31
GENERATE STATE MODEL
S32
SPECIFY DEFLECTION ERROR AND TORQUE ERROR
S33
CORRECT CUTTING DEPTH AND CONTROL EACH ACTUATOR
S34
UPDATE MACHINING SHAPE DATA
S35
S36
IS MACHINING COMPLETED?
NO
YES
CALCULATE DIFFERENCE BETWEEN MACHINING SHAPE AND TARGET SHAPE
S37
GENERATE DISPLAY IMAGE
S38
OUTPUT DISPLAY IMAGE
S39
END

CONTROL DEVICE, INDUSTRIAL MACHINE, AND CONTROL METHOD

CROSS-REFERENCE TO RELATED APPLICATIONS

This application is a U.S. National stage application of International Application No. PCT/JP2021/033327, filed on Sep. 10, 2021. This U.S. National stage application claims priority under 35 U.S.C. § 119 (a) to Japanese Patent Application No. 2020-155792, filed in Japan on Sep. 16, 2020, the entire contents of which are hereby incorporated herein by reference.

The present disclosure relates to a control device, an industrial machine, and a control method.

BACKGROUND INFORMATION

Japanese Unexamined Patent Application, First Publication No. 2006-159299 discloses a technique of using a tool of an industrial machine as a shape measuring probe. Specifically, Japanese Unexamined Patent Application, First Publication No. 2006-159299 discloses a technique of applying vibration to the tool and determining that the tool has come into contact with an object when a force sensor attached to the tool detects the vibration.

SUMMARY

In order to improve machining accuracy of a workpiece by a machine, such as an industrial machine, it is desired to correct a machining error while machining the workpiece.

An object of the present disclosure is to provide a control device, an industrial machine, and a control method capable of correcting a machining error while machining a workpiece.

According to a first aspect of the present disclosure, there is provided a control device of a machine having a jig which supports a workpiece and a tool which machines the workpiece. The control device includes a relative displacement specification unit configured to specify a relative displacement between the jig and the tool based on measurement values of displacements of the jig and the tool; a position determination unit configured to determine whether the jig and the tool are respectively positioned at a jig calibration point and a tool calibration point based on the measurement values of the displacements of the jig and the tool; a displacement correction unit configured to correct the measurement values of the displacements of the jig and the tool based on a captured image of the jig calibration point and a captured image of the tool calibration point when the jig and the tool are determined as being respectively positioned at the jig calibration point and the tool calibration point; a contact determination unit configured to determine whether the tool has come into contact with the workpiece based on a measurement value related to deflection of the tool; a tool length correction unit configured to correct tool length data indicating a length of the tool based on the relative displacement when the tool is determined to have come into contact with the workpiece; and a control unit configured to generate a control command for controlling the jig or tool based on the relative displacement, a shape of the workpiece, and the tool length data.

According to the above aspect, the control device can correct the machining error while machining the workpiece.

BRIEF DESCRIPTION OF DRAWINGS

FIG. 5 is a flowchart showing a machining operation of the control device according to the first embodiment.

DESCRIPTION OF EMBODIMENTS

First Embodiment

<<Configuration of Machining Center 20>>

Hereinafter, embodiments will be described in detail with reference to the drawings.

Figure 1:
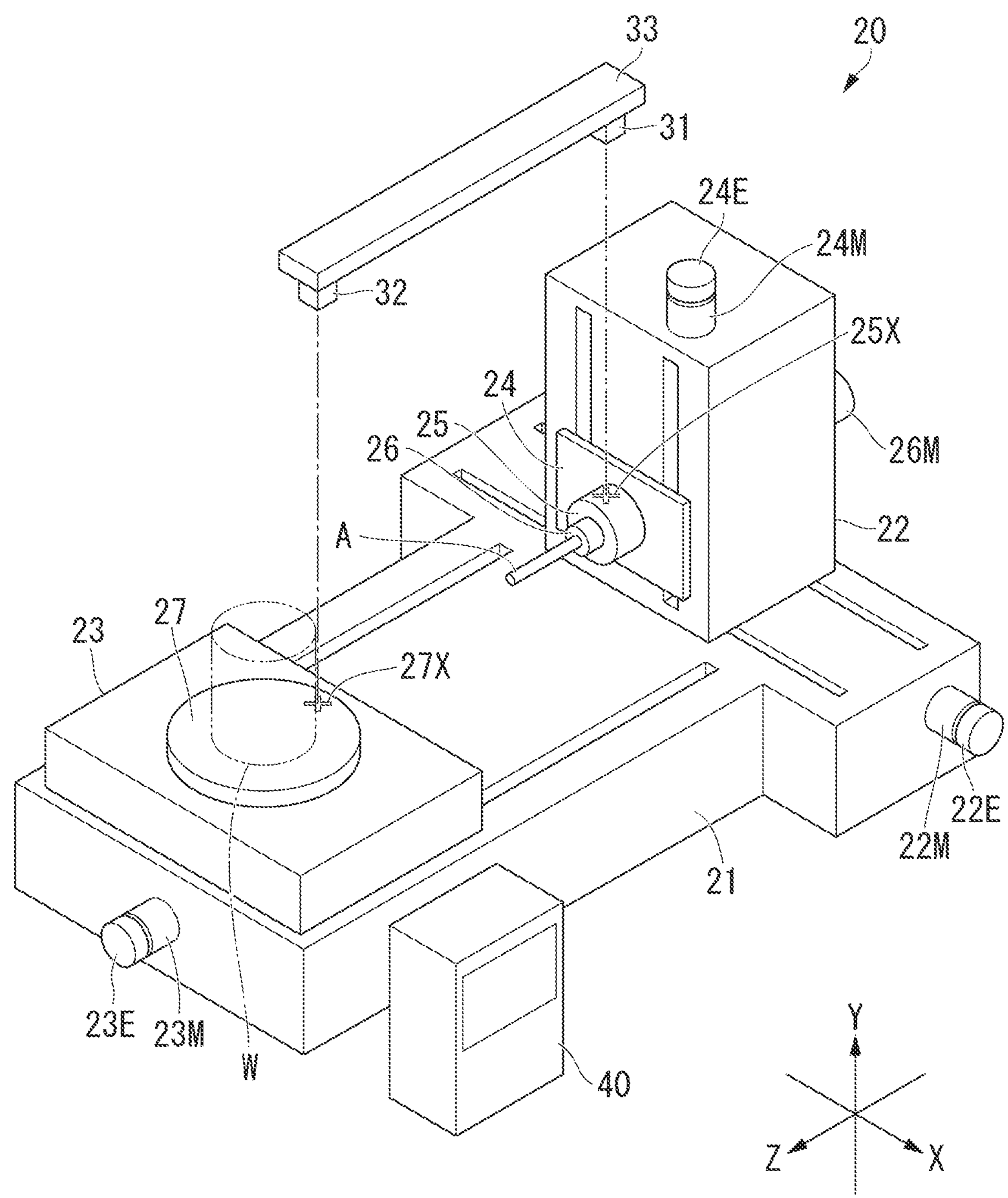
FIG. 1 is a perspective view showing an appearance of a machining center according to a first embodiment.

FIG. 1 is a perspective view showing an appearance of a machining center 20 according to a first embodiment. The machining center 20 includes a base 21, a column 22, a table 23, a head camera 31, a table camera 32 and a control device 40. The column 22 and the table 23 are provided on an upper surface of the base 21.

The column 22 is provided movably in an X-axis direction set parallel to the upper surface of the base 21. The base 21 is provided with an X-axis motor 22M and an X-axis encoder 22E. The X-axis motor 22M is an actuator for moving the column 22 along the X-axis. The rotation of the X-axis motor 22M is converted into linear motion by a ball screw mechanism (not shown). The X-axis encoder 22E measures an amount of movement of the column 22.

A slider 24 is attached to the column 22. The slider 24 is arranged on a side portion of the column 22 on the table 23 side, and is provided movably in a Y-axis direction orthogonal to both the X-axis and the Z-axis. The column 22 is provided with a Y-axis motor 24M and a Y-axis encoder 24E. The Y-axis motor 24M is an actuator for moving slider 24 along the Y-axis. The rotation of the Y-axis motor 24M is converted into linear motion by a ball screw mechanism (not shown). The Y-axis encoder 24E measures an amount of movement of the slider 24.

A spindle head 25 is attached to a surface of the slider 24 on the table 23 side. A head mark 25X is drawn on an upper surface of the spindle head 25. The head mark 25X is represented by, for example, an X mark as shown in FIG. 1. The shape of the head mark 25X is not limited to the X mark, and any shape that can specify the center position and angle may be used. The spindle head 25 supports a spindle 26 rotatably around a rotation axis parallel to the Z-axis. Note that the spindle head 25 itself does not rotate. A tool A is mounted on the spindle 26. A milling cutter is an exemplary example of the tool A. The spindle 26 is provided with a spindle motor 26M for rotating the spindle 26. The tool A is attached to the spindle 26 by the user and is replaceable.

Figure 2:
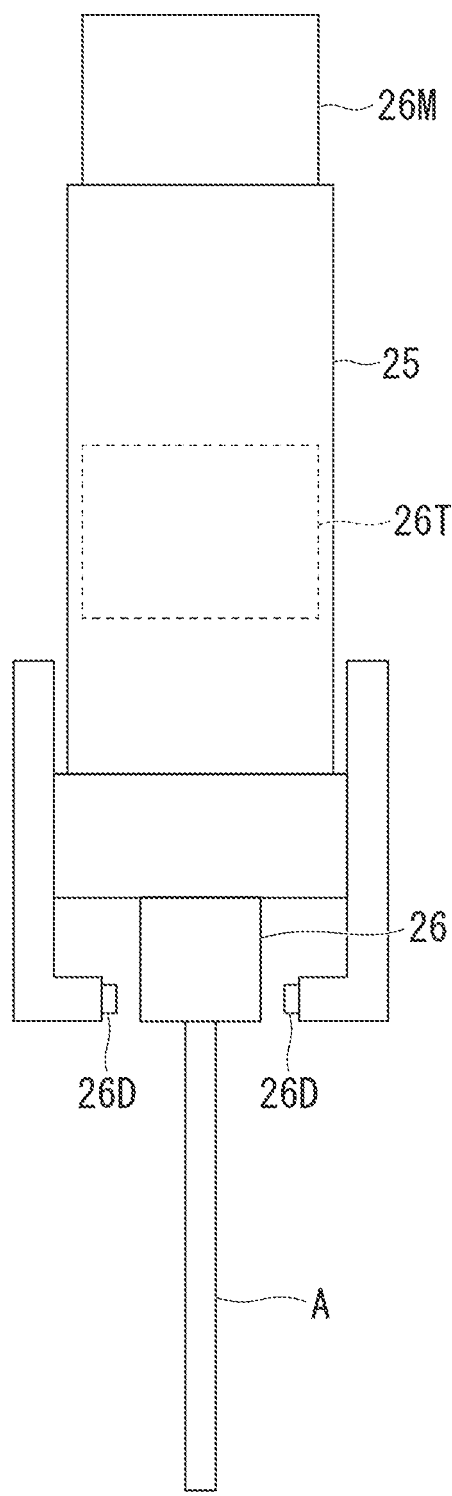
FIG. 2 is a schematic diagram showing a configuration of a spindle head according to the first embodiment.

FIG. 2 is a schematic diagram showing the configuration of the spindle head 25 according to the first embodiment. The spindle head 25 is provided with a displacement sensor 26D for measuring a displacement of a tool attachment portion of the spindle 26 and a torque sensor 26T for measuring a torque of the spindle 26. An eddy current displacement sensor is an exemplary example of the displacement sensor 26D. The displacement sensor 26D can measure deflection of the tool A by measuring the displacement of the tool attachment portion. In another embodiment, the machining center 20 may not include the torque sensor 26T, and the torque of the spindle 26 may be specified based on a torque command value and a current value of the spindle motor 26M.

The table 23 is provided movably in the Z-axis direction parallel to the upper surface of the base 21 and orthogonal to the X-axis. A work table 27 is attached to an upper portion of the table 23. The work table 27 is a jig that supports a workpiece W, which is an object to be machined. A table mark 27X is drawn on the upper surface of the work table 27. The table mark 27X is represented by, for example, an X mark as shown in FIG. 1. The shape of the table mark 27X is not limited to the X mark, and any shape that can specify the center position and angle may be used. The table mark 27X may be drawn on a portion of the table 23 where the workpiece W is not placed. Since the table mark 27X is drawn on the portion where the workpiece W is not placed, the later-described calibration can be performed in a state where the workpiece W is placed. The base 21 is provided with a Z-axis motor 23M and a Z-axis encoder 23E. The Z-axis motor 23M is an actuator for moving the table 23 along the Z-axis. The rotation of the Z-axis motor 23M is converted into linear motion by a ball screw mechanism (not shown). The Z-axis encoder 23E measures an amount of movement of the table 23.

The head camera 31 is provided such that an optical axis passes through the center of the head mark 25X of the spindle head 25 when the column 22 and slider 24 are positioned at predetermined calibration points. The head camera 31 is provided such that the optical axis is parallel to the Y-axis. The calibration point at which the column 22 should be positioned is also called a column calibration point. The calibration point at which the slider 24 should be positioned is also called a slider calibration point. When the column 22 is positioned at the column calibration point and the slider 24 is positioned at the slider calibration point, the spindle head 25 is positioned at a tool calibration point.

The table camera 32 is provided so that the optical axis passes through the center of the table mark 27X of the work table 27 when the table 23 is positioned at the predetermined calibration point. The table camera 32 is provided such that the optical axis is parallel to the Y-axis. The calibration point at which the table 23 should be positioned is also called a table calibration point. When the table 23 is positioned at the table calibration point, the work table 27 is positioned at a jig calibration point.

The head camera 31 and table camera 32 are attached to a camera jig 33. The camera jig 33 is provided with holes for attaching the head camera 31 and the table camera 32. The camera jig 33 is made of a material, such as ceramics, that hardly causes thermal expansion. The camera jig 33 is attached to a housing (not shown) that covers the machining center 20.

<<Configuration of Control Device 40>>

Figure 3:
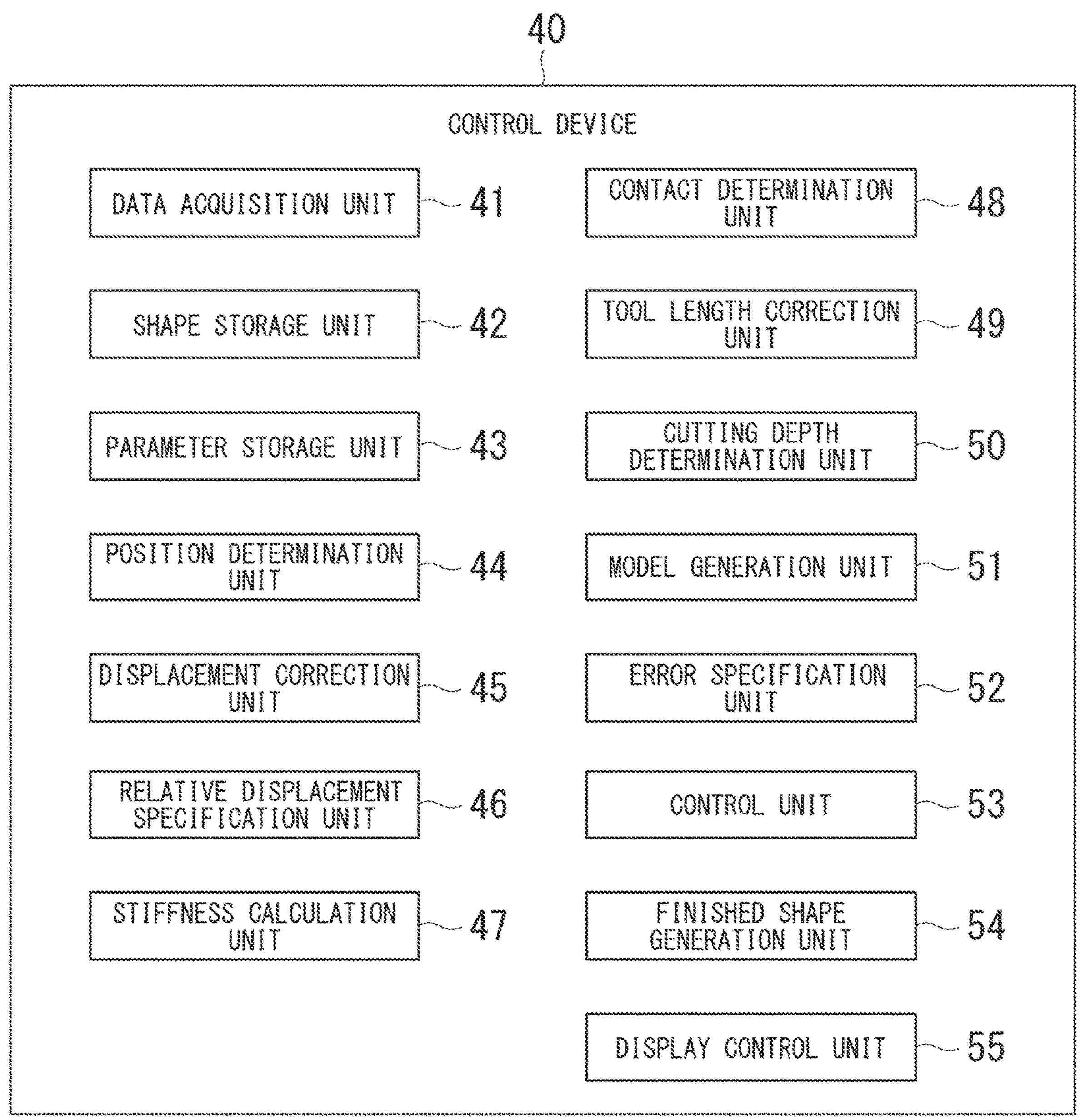
FIG. 3 is a schematic block diagram showing a configuration of a control device according to the first embodiment.

FIG. 3 is a schematic block diagram showing a configuration of the control device 40 according to the first embodiment. The control device 40 controls various actuators of the machining center 20 based on measurement data of the machining center 20.

The control device 40 includes a data acquisition unit 41, a shape storage unit 42, a parameter storage unit 43, a position determination unit 44, a displacement correction unit 45, a relative displacement specification unit 46, a stiffness calculation unit 47, a contact determination unit 48, a tool length correction unit 49, a cutting depth determination unit 50, a model generation unit 51, an error specification unit 52, a control unit 53, a finished shape generation unit 54, and a display control unit 55.

The data acquisition unit 41 acquires measurement data from various sensors of the machining center 20. Specifically, the data acquisition unit 41 acquires measurement data from the X-axis encoder 22E, Z-axis encoder 23E, Y-axis encoder 24E, displacement sensor 26D, and torque sensor 26T. The data acquisition unit 41 also acquires image data from the head camera 31 and the table camera 32.

The shape storage unit 42 stores target shape data that is three-dimensional data representing the target shape of the workpiece W, initial shape data that is three-dimensional data representing the initial shape of the workpiece W, and machining shape data that is three-dimensional data representing the shape of the workpiece W after machining. The target shape data and the initial shape data are input in advance by a user of the machining center 20. The initial value of the machining shape data is the same as the initial shape data.

The parameter storage unit 43 stores parameters used for control of the machining center 20 by the control unit 53. Specifically, the parameter storage unit 43 stores a relative displacement offset, a tool length, and a state model. The relative displacement offset is a correction value for the relative displacement between the spindle head 25 and the work table 27 obtained from the measurement data of the encoder. The relative displacement may include not only a translation amount but also a rotation angle. The relative displacement may be represented by an X-axis component and a Z-axis component of the distance between the center point of the head mark 25X and the center point of the table mark 27X. The rotation angle may be represented by an angle between a straight line extending from the center point of the head mark 25X to a feature point (for example, the upper right protrusion portion of the X mark) of the head mark 25X and a straight line extending from the center point of the table mark 27X to a feature point of the table mark 27X. The tool length is the length of the tool A attached to the spindle 26. The state model is a function that predicts machining errors caused by the state of the machining center 20 while the workpiece W is machined. Deflection of the tool A and changes in the torque of the spindle 26 are exemplary examples of the state of the machining center 20 during machining.

Based on the measurement data of the X-axis encoder 22E, the Z-axis encoder 23E, and the Y-axis encoder 24E acquired by the data acquisition unit 41, the position determination unit 44 determines whether the spindle head 25 and the work table 27 are positioned at predetermined calibration points in terms of calculation. Even when the spindle head 25 and work table 27 are determined as being positioned exactly at the calibration points in terms of calculation, the actual positions of the spindle head 25 and work table 27 may not match the calibration points due to encoder measurement errors or the like. Also in this case, the spindle head 25 and the work table 27 are positioned at least in the vicinity of the calibration points. The vicinity is a range in which the head mark 25X and the table mark 27X are positioned within an imaging range of the head camera 31 and the table camera 32.

The displacement correction unit 45 moves the spindle head 25 and work table 27 to the calibration points based on the image data of the head camera 31 and table camera 32. The displacement correction unit 45 updates the relative displacement offset stored in the parameter storage unit 43 based on the values of the X-axis encoder 22E, the Z-axis encoder 23E, and the Y-axis encoder 24E when the spindle head 25 and the work table 27 are positioned at the calibration points.

The relative displacement specification unit 46 specifies the relative displacement between the spindle head 25 and the work table 27 based on the measurement data of the X-axis encoder 22E, the Z-axis encoder 23E, and the Y-axis encoder 24E, and the relative displacement offset stored in the parameter storage unit 43. For example, the relative displacement specification unit 46 specifies the position of the spindle head 25 when the center point on the upper surface of the work table 27 is used as a reference.

The stiffness calculation unit 47 calculates the stiffness of the tool A based on the measurement data of the displacement sensor 26D and the torque sensor 26T. Specifically, the stiffness K is calculated according to the following equation (1).

[Equation 1]

$$K = \frac{T}{|\varepsilon| + \delta}\operatorname{sign}(\varepsilon) \tag{1}$$

T is the measurement value of the torque sensor 26T. ε is the measurement value of the displacement sensor 26D. In addition, ε is theoretically zero when the tool A is not deflected. δ is a predetermined minute value. The minute value δ is set so that a solution for the stiffness K can be obtained even when the deflection ε is zero. sign(ε) is a function representing the sign of the deflection ε.

The contact determination unit 48 determines whether the tool A has come into contact with the workpiece W based on the stiffness value calculated by the stiffness calculation unit 47. Since the deflection ε of the tool A is zero when the tool A does not come into contact with the workpiece W, the stiffness value calculated by the equation (1) diverges. Meanwhile, when the tool A comes into contact with the workpiece W, the deflection ε of the tool A is no longer zero, and thus, the stiffness value calculated by the equation (1) converges. Therefore, the contact determination unit 48 determines that the tool A has come into contact with the workpiece W when the stiffness values calculated by the stiffness calculation unit 47 converge from the divergent state.

The tool length correction unit 49 specifies the tool length based on the relative displacement between the spindle head 25 and the work table 27 when the tool A is determined to have come into contact with the workpiece W, and the initial shape data stored in the shape storage unit 42. Specifically, the tool length correction unit 49 specifies the tool length in the following procedure. The tool length correction unit 49 obtains a height (Z-axis value) of a point where the workpiece W faces the tool A based on the values of the X-axis and Y-axis components of the relative displacement between the spindle head 25 and the work table 27, and the tool length correction unit 49 specifies the tool length by subtracting the height of the point where the workpiece W faces the tool A from the value of the Z-axis component of the relative displacement between the spindle head 25 and the work table 27.

The cutting depth determination unit 50 calculates a cutting depth of the workpiece W based on the relative displacement between the spindle head 25 and the work table 27 specified by the relative displacement specification unit 46 and the target shape data stored in the shape storage unit 42.

The model generation unit 51 updates the state model stored in the parameter storage unit 43 based on the cutting depth calculated by the cutting depth determination unit 50 and the measurement data of the displacement sensor 26D and the torque sensor 26T. Specifically, the model generation unit 51 updates the state model to output a deflection versus cutting gain that indicates the amount of change in the deflection of the tool A with respect to the cutting depth and a torque versus cutting gain that indicates the amount of change in the torque of the spindle 26 with respect to the cutting depth. A state model is realized by a Kalman filter, for example.

By substituting the cutting depth calculated by the cutting depth determination unit 50 into the state model stored in the parameter storage unit 43, the error specification unit 52 specifies errors in the deflection of the tool A and the torque of the spindle 26 caused by the instruction of the cutting depth calculated by the cutting depth determination unit 50.

The control unit 53 corrects the cutting depth determined by the cutting depth determination unit 50 so as to cancel the error calculated by the error specification unit 52, and generates a control signal of each actuator based on the tool length stored in the parameter storage unit 43.

The finished shape generation unit 54 generates three-dimensional data representing the shape of the workpiece W to be machined based on the measurement data of the X-axis encoder 22E, Z-axis encoder 23E, Y-axis encoder 24E, displacement sensor 26D, and torque sensor 26T.

The display control unit 55 outputs the generated three-dimensional data to a display or the like.

<<Operation of Control Device 40>>

Figure 4:
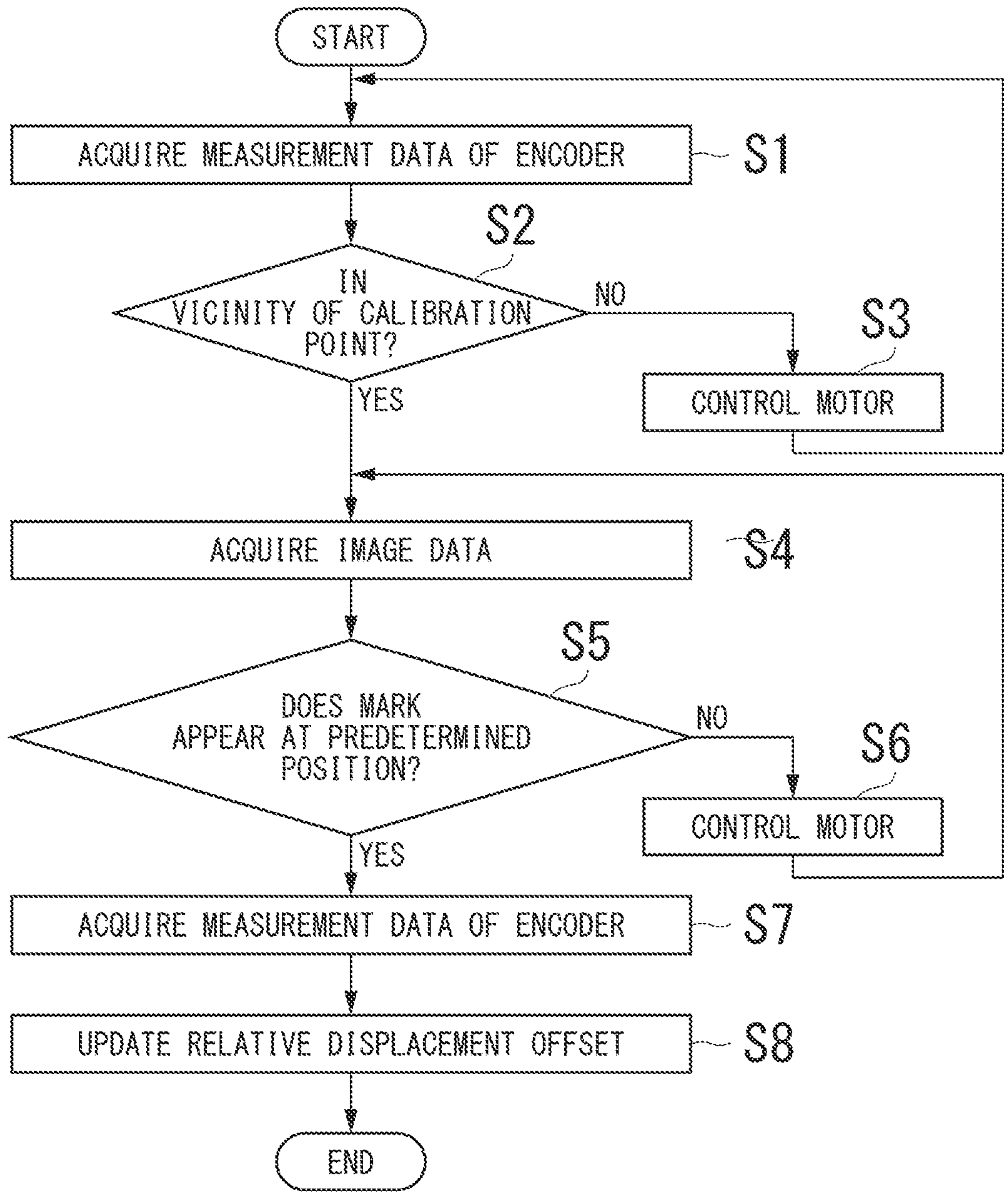
FIG. 4 is a flowchart showing a calibration operation of the control device according to the first embodiment.

FIG. 4 is a flowchart showing the calibration operation of the control device 40 according to the first embodiment. In the example shown in FIG. 1, the table mark 27X is drawn on a portion where the workpiece W is not placed, and the head mark 25X is drawn on a portion different from the attachment position of the tool A. As a result, the control device 40 can perform calibration in a state where the tool A and the workpiece W are placed, that is, immediately before machining. Meanwhile, when the table mark 27X is drawn on the portion where the workpiece W is placed, the calibration is performed in a state where the workpiece W is not placed on the table 23, and the workpiece W is placed on the table 23 after the calibration.

When the machining center 20 starts up, the data acquisition unit 41 acquires the measurement data from the X-axis encoder 22E, the Z-axis encoder 23E, and the Y-axis encoder 24E (Step S1). The position determination unit 44 determines whether the spindle head 25 and the work table 27 are positioned in the vicinity of a predetermined calibration point based on the measurement data acquired in Step S1 (Step S2). That is, the position determination unit 44 determines whether the values of the X-axis encoder 22E, the Z-axis encoder 23E, and the Y-axis encoder 24E indicate the positions of the calibration points. When the spindle head 25 and the work table 27 are not positioned in the vicinity of the predetermined calibration point (Step S2: NO), the control unit 53 controls the X-axis motor 22M, the Z-axis motor 23M, and the Y-axis motor 24M so that the spindle head 25 and the work table 27 are positioned at the predetermined calibration point based on the measurement data acquired in Step S1 (Step S3). After that, the control device 40 returns the process to Step S1.

When the spindle head 25 and the work table 27 are positioned in the vicinity of the predetermined calibration point (Step S2: YES), the data acquisition unit 41 acquires the image data from the head camera 31 and the table camera 32 (Step S4). The displacement correction unit 45 determines whether the head mark 25X and the table mark 27X appearing in the image data acquired in Step S4 appear at a predetermined position (for example, the center of the image) of the image data and in a predetermined size (Step S5). That is, the displacement correction unit 45 stores in advance the shapes of the head mark 25X and the table mark 27X when the spindle head 25 and the work table 27 are positioned at the calibration points, and determines whether the head mark 25X and the table mark 27X appearing in the image data match the shapes. When the head mark 25X or the table mark 27X does not appear at a predetermined position and in a predetermined size (Step S5: NO), the control unit 53 controls the X-axis motor 22M, the Z-axis motor 23M, and the Y-axis motor 24M so as to reduce a shape error (Step S6). Then, the control device 40 returns the process to Step S4.

Meanwhile, when the head mark 25X and the table mark 27X appear at a predetermined position and in a predetermined size (Step S5: YES), the data acquisition unit 41 acquires the measurement data from the X-axis encoder 22E, the Z-axis encoder 23E, and the Y-axis encoder 24E (Step S7). The displacement correction unit 45 calculates, as a relative displacement offset, a difference between the values of the X-axis encoder 22E, Z-axis encoder 23E, and Y-axis encoder 24E set as the positions of the calibration points and the measurement data acquired in Step S7, and stores the difference in the parameter storage unit 43 (Step S8). Thereby, the control device 40 can calibrate the relative displacement between the spindle head 25 and the work table 27 at high speed.

FIG. 5 is a flowchart showing the machining operation of the control device 40 according to the first embodiment.

After the calibration of the machining center 20 is completed, the control device 40 starts machining the workpiece W. An operator stores initial shape data and target shape data in the shape storage unit 42 before starting machining.

When the control device 40 starts machining, the data acquisition unit 41 acquires measurement data from the X-axis encoder 22E, Z-axis encoder 23E, and Y-axis encoder 24E (Step S21). The relative displacement specification unit 46 specifies the relative displacement between the spindle head 25 and the work table 27 based on the acquired measurement data and the relative displacement offset stored in the parameter storage unit 43 (Step S22). The control unit 53 determines a machining start point of the workpiece W based on the target shape data, and controls the X-axis motor 22M and the Y-axis motor 24M so that the tool A faces the machining start point of the workpiece W based on the relative displacement specified in Step S22 (Step S23).

Next, the control unit 53 controls the Z-axis motor 23M so that the tool A approaches the workpiece W by a predetermined amount (Step S24). The data acquisition unit 41 acquires measurement data from the X-axis encoder 22E, the Z-axis encoder 23E, the Y-axis encoder 24E, the displacement sensor 26D, and the torque sensor 26T (Step S25). The relative displacement specification unit 46 specifies the relative displacement between the spindle head 25 and the work table 27 (Step S26). The stiffness calculation unit 47 calculates the stiffness of the tool A based on the measurement data of the displacement sensor 26D and the torque sensor 26T acquired in Step S25 (Step S27). The contact determination unit 48 determines whether the stiffness values calculated in Step S27 diverge (Step S28).

When the stiffness values diverge (Step S28: YES), the control device 40 returns the process to Step S24. Meanwhile, when the stiffness value does not diverge (Step S28: NO), the tool length correction unit 49 specifies the tool length based on the relative displacement calculated in Step S26 and the initial shape data stored in the shape storage unit 42 (Step S29), and updates the tool length stored in the parameter storage unit 43. Next, the cutting depth determination unit 50 calculates the cutting depth of the workpiece W based on the relative displacement between the spindle head 25 and the work table 27 specified by the relative displacement specification unit 46 and the target shape data stored in the shape storage unit 42 (Step S30). The data acquisition unit 41 acquires the measurement data from the X-axis encoder 22E, the Z-axis encoder 23E, the Y-axis encoder 24E, the displacement sensor 26D, and the torque sensor 26T (Step S31).

The model generation unit 51 generates a state model based on the cutting depth calculated in Step S30 and the measurement data of the displacement sensor 26D and the torque sensor 26T (Step S32). That is, the model generation unit 51 generates the state model to output the deflection versus cutting gain that indicates the amount of change in the deflection of the tool A with respect to the cutting depth and the torque versus cutting gain that indicates the amount of change in the torque of the spindle 26 with respect to the cutting depth. By substituting the cutting depth calculated in Step S30 into the state model stored in the parameter storage unit 43, the error specification unit 52 specifies the errors of the deflection of the tool A and the torque of the spindle 26 caused by the instruction of the cutting depth calculated in Step S30 (Step S33). That is, the error specification unit 52 calculates the amount of deflection of the tool A by multiplying the cutting depth by the deflection versus cutting depth gain obtained from the state model. The error specification unit 52 also calculates the torque of the spindle 26 by multiplying the cutting depth by the torque versus cutting depth gain obtained from the state model. Then, the error specification unit 52 can specify each error by comparing the calculated value based on the state model and the measurement value. From these errors, the difference between the instructed cutting depth and the actual cutting depth, that is, the machining error is known.

The control unit 53 corrects the cutting depth based on the cutting depth calculated in Step S30 and the error calculated in Step S33, and controls each actuator based on the tool length stored in the parameter storage unit 43 (Step S34). The finished shape generation unit 54 updates the machining shape data based on the measurement data acquired in Step S31 (Step S35).

The control unit 53 determines whether the machining of the workpiece W is completed (Step S36). When the machining of the workpiece W is not completed (Step S36: NO), the control device 40 returns the process to Step S30. Meanwhile, when the machining of the workpiece W is completed (Step S36: YES), the display control unit 55 calculates the difference between the machining shape data stored in the shape storage unit 42 and the target shape data (Step S37). The display control unit 55 maps a color corresponding to the difference calculated in Step S37 on the surface of the machining shape data, and renders the machining shape data to generate a display image (Step S38). The display control unit 55 outputs the display image to the display (Step S39). The color corresponding to the difference may be represented, for example, by red for a portion that is insufficiently shaved, blue for a portion that is excessively shaved, and a gradation of the magnitude of the difference.

As a result, the control device 40 can correct the machining error while machining the workpiece W, and allow the operator to visually recognize the difference between the finished product and the target shape.

Action/Effect

In this way, the control device 40 according to the first embodiment corrects the tool length data based on the relative displacement between the spindle head 25 and the work table 27 and the measurement values of the deflection of the tool. That is, the control device 40 can detect contact between the workpiece W and the tool A during machining of the workpiece W, and correct the tool length data based on this. Thereby, the control device 40 can correct the machining error due to the tool length while machining the workpiece W.

Figure 8:
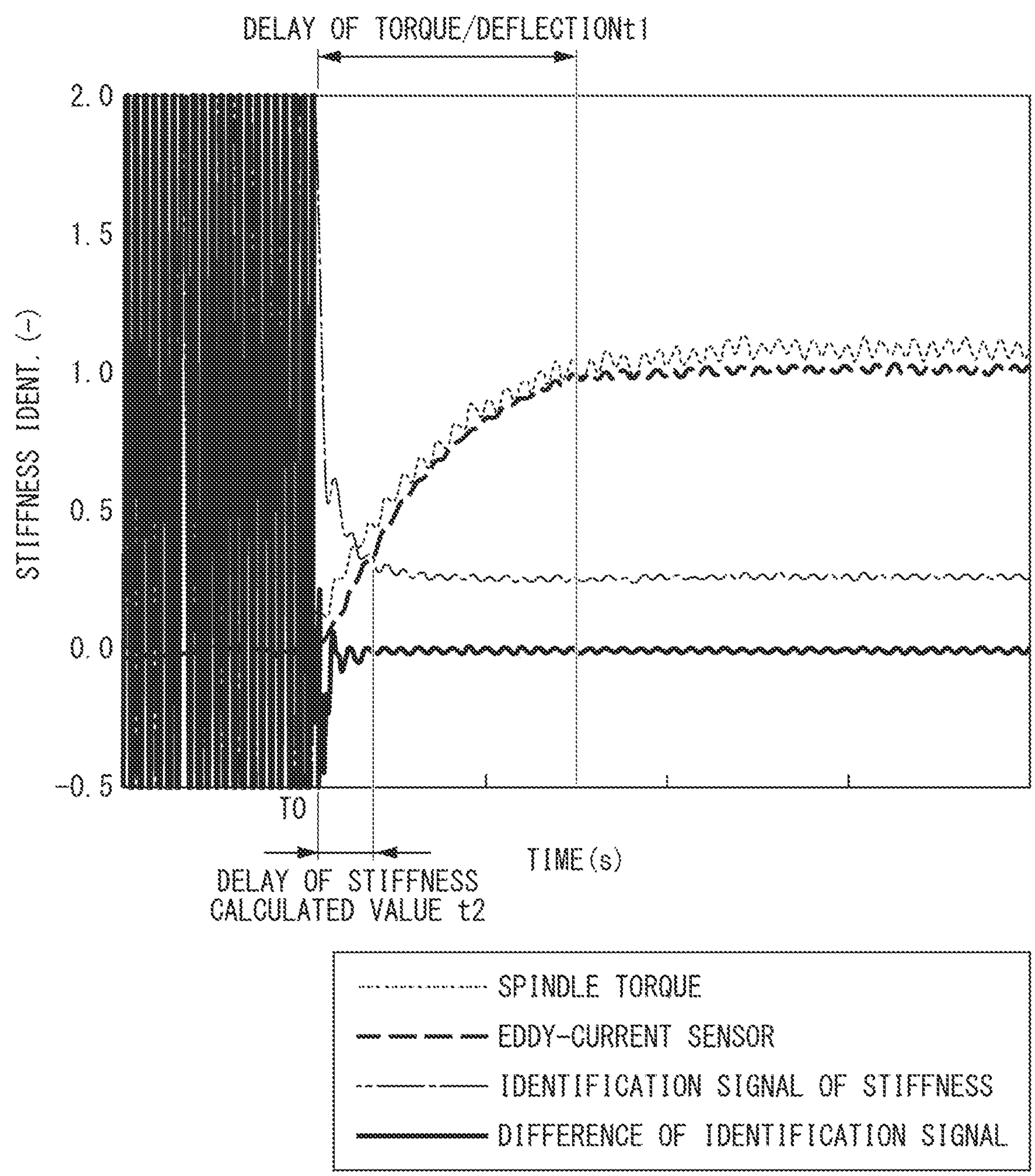
FIG. 8 is a graph showing the relationship between measurement values of a torque and deflection and a calculated value of stiffness.

The control device 40 according to the first embodiment calculates the stiffness based on the torque of the tool A and the deflection of the tool A, and determines the contact between the tool A and the workpiece W based on the calculated values. FIG. 8 is a graph showing the relationship between measurement values of torque and deflection and the calculated values of stiffness. As shown in FIG. 8, there is a delay between the contact between the workpiece W and the tool A and the significant change in the measurement values of the torque of the tool A and the deflection of the tool A. For example, in the example shown in FIG. 8, the workpiece W and the tool A are in contact at a time TO. The measurement values of the torque of the tool A and the deflection of the tool A change due to the contact between the workpiece W and the tool A, and reach a steady state after a time t1 has elapsed from the contact between the workpiece W and the tool A. That is, there is a delay of the time t1 from the contact between the workpiece W and the tool A until the measurement values of the torque of the tool A and the deflection of the tool A significantly change. Meanwhile, the calculated value of the stiffness converges after a time t2 has elapsed from the contact between the workpiece W and the tool A. As shown in FIG. 8, it can be seen that the time t2 is significantly shorter than time t1. Specifically, the time t2 is approximately one-fifth of the time t1. From this, it can be seen that the calculated value of the stiffness is highly sensitive to the contact between the workpiece W and the tool A. Therefore, the control device 40 according to the first embodiment can perform contact determination without delay by using the calculated value of the stiffness.

Figure 6:
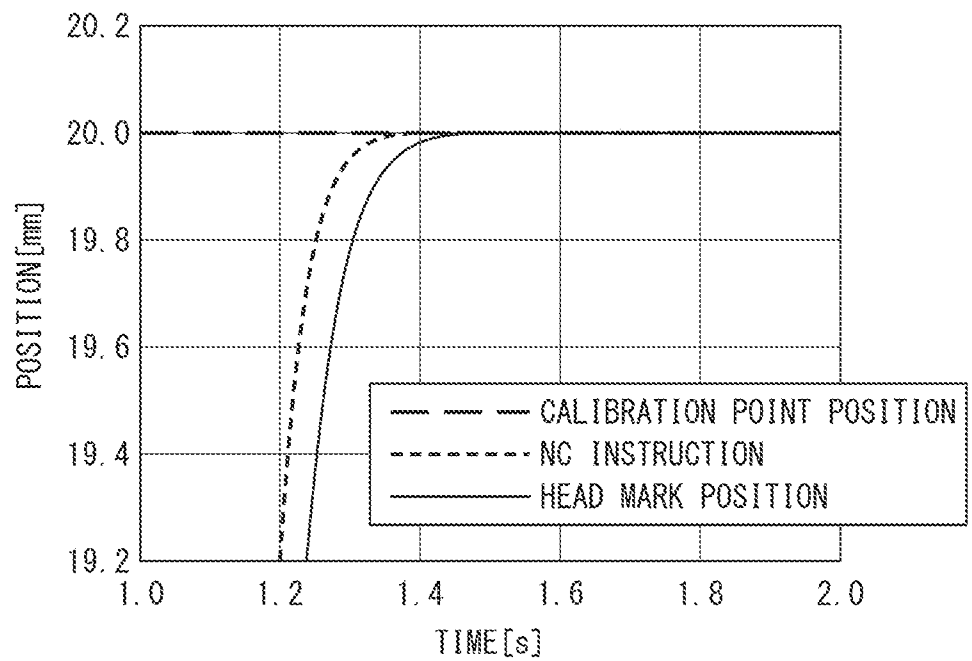
FIG. 6 is a diagram showing a relationship between a position of a calibration point and a position of a head mark during a relative displacement correcting operation based on a captured image.
Figure 7:
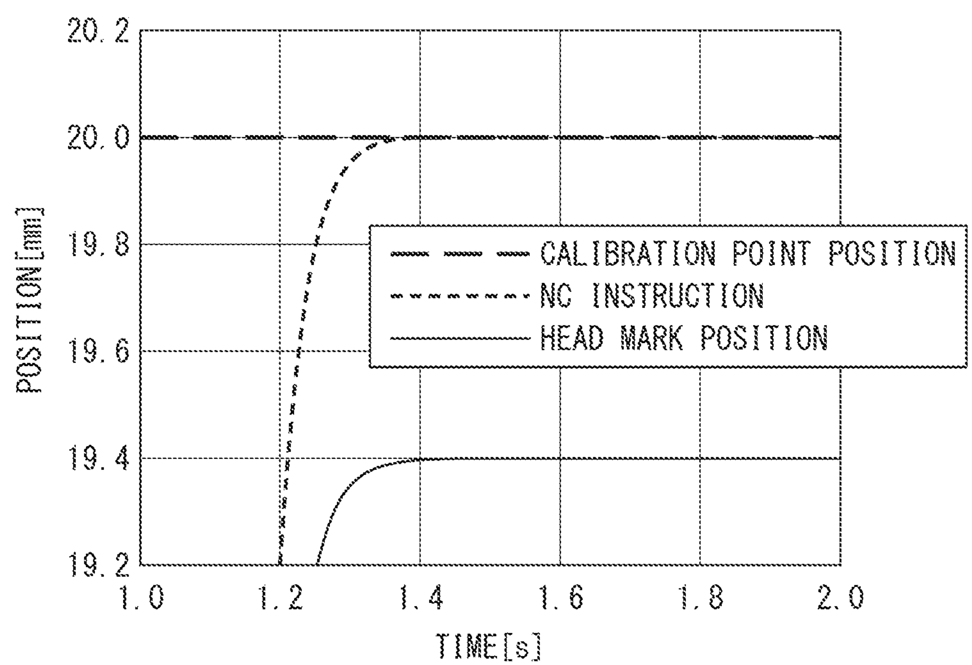
FIG. 7 is a diagram showing the relationship between the position of the calibration point and the position of the head mark when the spindle head is controlled to be positioned at the calibration point without correcting the relative displacement.

The control device 40 according to the first embodiment corrects the relative displacement between the spindle head 25 and the work table 27 based on the images captured by the head camera 31 and the table camera 32 when the spindle head 25 and the work table 27 are positioned at the predetermined calibration points. Thereby, the control device 40 can correct the measurement error of the encoder. FIG. 6 is a diagram showing a relationship between the position of the calibration point and the position of the head mark 25X during relative displacement correcting operation based on the captured image. FIG. 7 is a diagram showing a relationship between the position of the calibration point and the position of the head mark 25X when the spindle head 25 is controlled to be positioned at the calibration point without correcting the relative displacement. As shown in FIG. 7, when machining is controlled according to Numerical Control (NC) data generated from the target shape data without correcting the tool position, due to the effects of displacement or the like due to heat and gravity, an error in the position of the tool appears as it is as a machining error.

The relative displacement between the head camera 31 and the table camera 32 is fixed by the camera jig 33. Therefore, by using the images captured by the head camera 31 and the table camera 32 as references to correct the relative displacement between the spindle head 25 and the work table 27, the machining error can be reduced.

The control device 40 according to the first embodiment corrects the relative displacement by driving the actuator so that the head mark 25X and the table mark 27X appear in a predetermined shape in the captured image. Therefore, the relative displacement between the spindle head 25 and work table 27 can be corrected without precise calibration of the head camera 31 and table camera 32. In another embodiment, by setting the positions of the head camera 31 and the table camera 32 precisely, the displacement correction unit 45 may calculate the relative displacement offset from a deviation amount of the head mark 25X and the table mark 27X in the captured image. By correcting the relative displacement between the spindle head 25 and the work table 27 using the image, the control device 40 can correct not only the relative translation amount but also the rotation angle, that is, the deviation of the relative posture.

Figure 9:
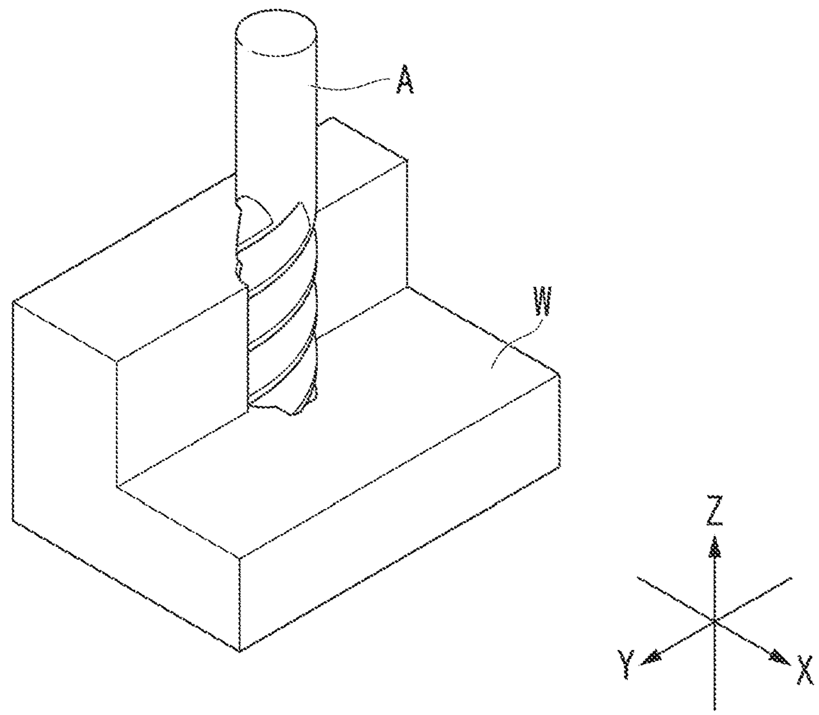
FIG. 9 is a diagram showing an example of side machining of a workpiece.
Figure 10:
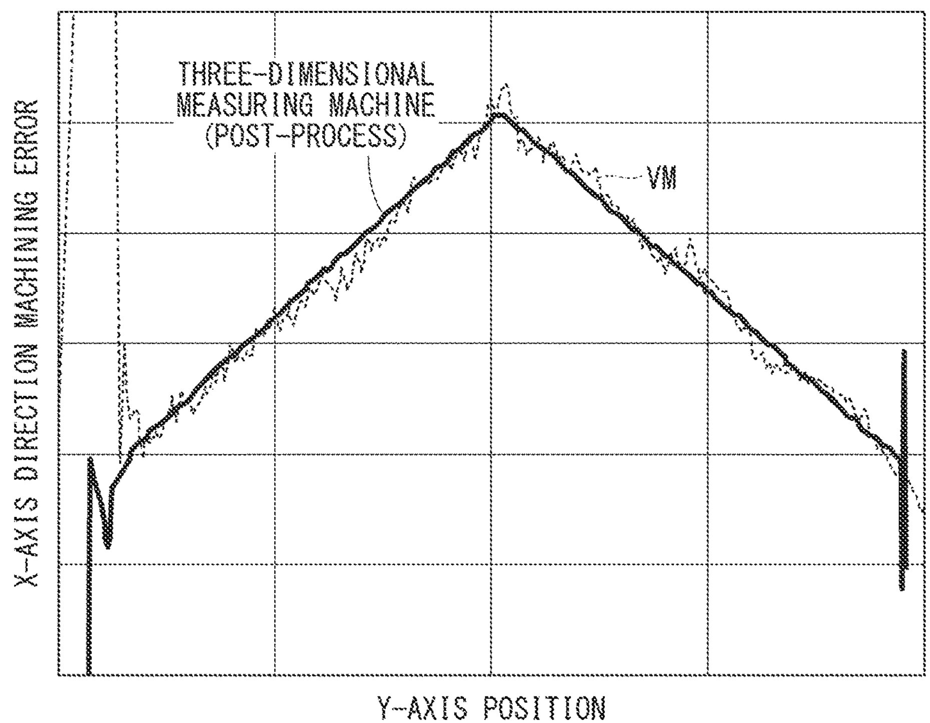
FIG. 10 is a diagram showing measurement results of a machining error of a workpiece due to side machining.

The control device 40 according to the first embodiment generates a state model for calculating the state of the machining center 20 based on the measurement value and the cutting depth of the machining center 20, and specifies the control error from the cutting depth based on the state model. Thereby, the control device 40 can correct the control error while machining the workpiece W. A tip portion of the tool A cannot be observed with a camera or the like due to the presence of sparks, chips, and coolant during machining of the workpiece W. However, according to the control device 40 of the present embodiment, the state of the tip of the tool A can be recognized regardless of the presence or absence of these. FIG. 9 is a diagram showing an example of side machining of the workpiece W. According to FIG. 9, the machining center 20 machines the side surface of the workpiece W along the Y-axis with the tool A. In this case, the tool A comes into contact with the side surface of the workpiece W and bends in the X-axis direction. FIG. 10 is a diagram showing the measurement results of the machining error of the workpiece due to the side machining. As shown in FIG. 10, it can be seen that the machining error specified from the state model during the side machining substantially matches the machining error measured using a three-dimensional measuring machine after the side machining. That is, according to the present embodiment, the control device 40 can present the machining error with high accuracy without measuring the machining error in a post-process.

OTHER EMBODIMENTS

Although one embodiment has been described in detail above with reference to the drawings, the specific configuration is not limited to the one described above, and various design changes and the like can be made. That is, in other embodiments, the order of the processes described above may be changed as appropriate. Moreover, some processes may be executed in parallel.

The control device 40 according to the above-described embodiment may be configured by a single computer, or the configuration of the control device 40 may be arranged to be divided into a plurality of computers, and the plurality of computers may function as the control device 40 by cooperating with each other. In this case, some of the computers constituting the control device 40 may be mounted inside the machining center 20 and the other computers may be provided outside the machining center 20.

Although the control device 40 according to the embodiment described above controls the machining center 20, it is not limited to this. For example, the control device 40 according to other embodiments may control other machine tools, such as grinders, milling machines, lathes, and drilling machines.

In the embodiment described above, the deflection of the tool A is detected by the eddy-current displacement sensor 26D, but the present disclosure is not limited to this. For example, in other embodiments, the deflection of the tool A may be detected by a plurality of strain sensors and acceleration sensors attached to the spindle 26.

In the embodiment described above, the head mark 25X is drawn on the upper surface of the spindle head 25, and the head camera 31 is provided above the spindle head 25, but the present disclosure is not limited to this. For example, the head mark 25X may be drawn on the side surface of the spindle head 25, and the head camera 31 may be provided on the side of the spindle head 25. Similarly, the table mark 27X may be drawn on the side surface of the table 23, and the table camera 32 may be provided on the side of the table 23. In another embodiment, a plurality of head cameras 31 and table cameras 32 may be provided, and the control device 40 may perform calibration based on images captured by each camera.

<Computer Configuration>

Figure 11:
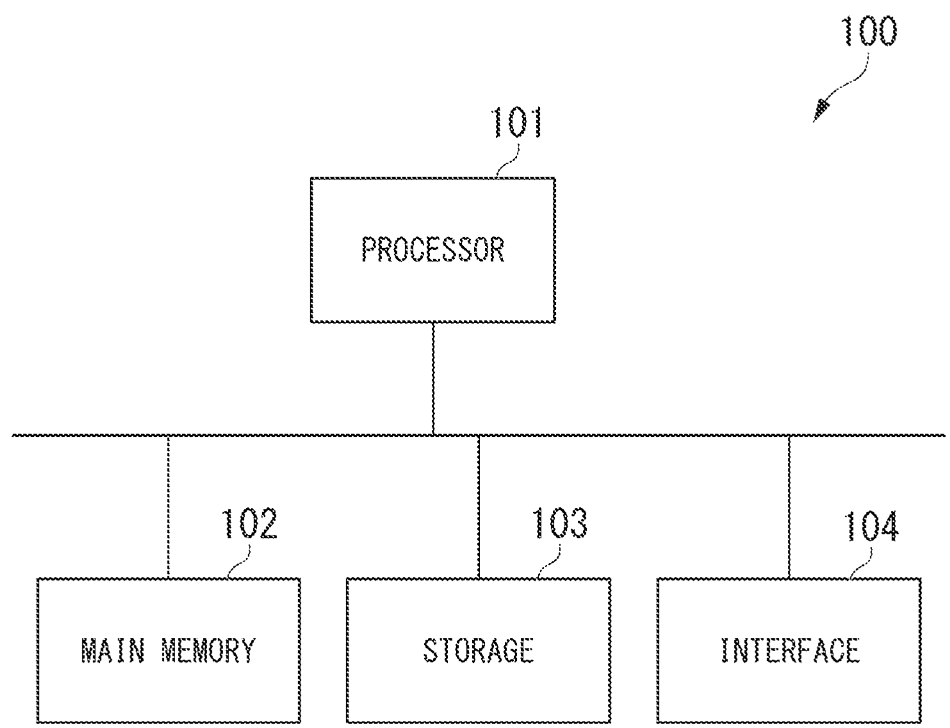
FIG. 11 is a schematic block diagram showing a configuration of a computer according to at least one embodiment.

FIG. 11 is a schematic block diagram showing the configuration of a computer according to at least one embodiment.

A computer 100 includes a processor 101, a main memory 102, a storage 103 and an interface 104.

The control device 40 described above is implemented in the computer 100.

The operation of each processing unit described above is stored in the storage 103 in the form of a program. The processor 101 reads a program from the storage 103, develops the program in the main memory 102, and executes the above process according to the program. In addition, the processor 101 secures storage areas corresponding to the storage units described above in the main memory 102 according to the program. A Central Processing Unit (CPU), a Graphic Processing Unit (GPU), a microprocessor, and the like are exemplary examples of the processor 101.

The program may be for realizing part of the functions that the computer 100 is caused to exhibit. For example, the program may function in combination with another program already stored in the storage or in combination with another program implemented in another device. In another embodiment, the computer 100 may include a custom Large Scale Integrated Circuit (LSI) such as a Programmable Logic Device (PLD) in addition to or instead of the above configuration. A Programmable Array Logic (PAL), a Generic Array Logic (GAL), a Complex Programmable Logic Device (CPLD), and a Field Programmable Gate Array (FPGA) are exemplary examples of the PLD. In this case, some or all of the functions realized by the processor 101 may be realized by the integrated circuit. Such an integrated circuit is also included as an example of a processor.

A magnetic disk, a magneto-optical disk, an optical disk, a semiconductor memory, and the like are exemplary examples of the storage 103. The storage 103 may be an internal medium directly connected to a bus of the computer 100, or an external medium connected to the computer 100 via the interface 104 or communication line. Further, when this program is distributed to the computer 100 via a communication line, the computer 100 receiving the distribution may develop the program in the main memory 102 and execute the above process. In at least one embodiment, the storage 103 is a non-transitory, and tangible storage medium.

Moreover, the program may be for realizing some of the functions described above. Furthermore, the program may be a so-called difference file (difference program) that realizes the above-described functions in combination with another program already stored in the storage 103.

According to the control device of the above embodiment, it is possible to correct a machining error while machining a workpiece.

The invention claimed is:

1. A control device of a machine having a jig which supports a workpiece and a tool which machines the workpiece, the control device comprising:

a relative displacement specification unit configured to specify a relative displacement between the jig and the tool based on measurement values of displacements of the jig and the tool;

a position determination unit configured to determine whether the jig and the tool are respectively positioned at a jig calibration point and a tool calibration point based on the measurement values of the displacements of the jig and the tool;

a displacement correction unit configured to correct the measurement values of the displacements of the jig and the tool based on a captured image of the jig calibration point and a captured image of the tool calibration point when the jig and the tool are determined as being respectively positioned at the jig calibration point and the tool calibration point;

a contact determination unit configured to determine whether the tool has come into contact with the workpiece based on a measurement value related to a deflection of the tool;

a tool length correction unit configured to correct tool length data indicating a length of the tool based on the relative displacement when the tool is determined to have come into contact with the workpiece; and a control unit configured to generate a control command for controlling the jig or the tool based on the relative displacement, a shape of the workpiece, and the tool length data.

2. The control device according to claim 1, further comprising a stiffness calculation unit configured to calculate a stiffness of the tool based on a torque of the tool and the measurement value related to the deflection of the tool, the contact determination unit determining that the tool has come into contact with the workpiece when a calculated value of the stiffness converges.

3. The control device according to claim 2, further comprising
a model generation unit configured to generate a state model for calculating a state of the machine based on a measurement value and the control command related to the machine; and
an error specification unit configured to specify a control error by inputting the measurement value and the control command related to the machine into the state model.

4. The control device according to claim 3, further comprising
a finished shape generation unit configured to generate three-dimensional data representing the shape of the workpiece machined by the control command based on the control error,
the control unit generating the control command based on target data representing a target shape.

5. The control device according to claim 1, further comprising
a model generation unit configured to generate a state model for calculating a state of the machine based on a measurement value and the control command related to the machine; and
an error specification unit configured to specify a control error by inputting the measurement value and the control command related to the machine into the state model.

6. The control device according to claim 5, further comprising
a finished shape generation unit configured to generate three-dimensional data representing the shape of the workpiece machined by the control command based on the control error,
the control unit generating the control command based on target data representing a target shape.

7. An industrial machine comprising:
the jig configured to support the workpiece;
the tool configured to machine the workpiece; and
the control device according to claim 1.

8. An industrial machine comprising:
the jig configured to support the workpiece;
the tool configured to machine the workpiece; and
the control device according to claim 2.

9. An industrial machine comprising:
the jig configured to support the workpiece;
the tool configured to machine the workpiece; and
the control device according to claim 5.

10. An industrial machine comprising:
the jig configured to support the workpiece;
the tool configured to machine the workpiece; and
the control device according to claim 6.

11. An industrial machine comprising:
the jig configured to support the workpiece;
the tool configured to machine the workpiece; and
the control device according to claim 3.

12. An industrial machine comprising:
the jig configured to support the workpiece;
the tool configured to machine the workpiece; and
the control device according to claim 4.

13. A control method of a machine having a jig which supports a workpiece and a tool which machines the workpiece, the control method comprising the steps of:
specifying a relative displacement between the jig and the tool based on measurement values of displacements of the jig and the tool;
determining whether the jig and the tool are respectively positioned at a jig calibration point and a tool calibration point based on the measurement values of the displacements of the jig and the tool;
correcting the measurement values of the displacements of the jig and the tool based on a captured image of the jig calibration point and a captured image of the tool calibration point when the jig and the tool are determined as being respectively positioned at the jig calibration point and the tool calibration point;
determining whether the tool has come into contact with the workpiece based on a measurement value related to a deflection of the tool;
correcting tool length data indicating a length of the tool based on the relative displacement when the tool is determined to have come into contact with the workpiece; and
generating a control command for controlling the jig or the tool based on the relative displacement, a shape of the workpiece, and the tool length data.

* * * * *